United States Patent
Rasmussen et al.

(10) Patent No.: US 7,526,926 B2
(45) Date of Patent: May 5, 2009

(54) METHOD FOR EFFICIENT NONSYNCHRONOUS LNG PRODUCTION

(75) Inventors: Peter C. Rasmussen, Conroe, TX (US); Stephen Wright, Tokyo (JP); John D. Walter, Longview, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 377 days.

(21) Appl. No.: 10/569,785

(22) PCT Filed: Sep. 20, 2004

(86) PCT No.: PCT/US2004/030669

§ 371 (c)(1),
(2), (4) Date: Feb. 24, 2006

(87) PCT Pub. No.: WO2005/047789

PCT Pub. Date: May 26, 2005

(65) Prior Publication Data

US 2006/0283206 A1    Dec. 21, 2006

Related U.S. Application Data

(60) Provisional application No. 60/517,955, filed on Nov. 6, 2003.

(51) Int. Cl.
| | |
|---|---|
| *F25J 3/00* | (2006.01) |
| *F25J 1/00* | (2006.01) |
| *F25B 1/00* | (2006.01) |
| *F25B 49/00* | (2006.01) |
| *F01D 15/10* | (2006.01) |
| *F02C 6/00* | (2006.01) |
| *F01K 25/02* | (2006.01) |
| *F02C 1/04* | (2006.01) |

(52) U.S. Cl. .......................... 62/619; 62/228.1; 62/611; 290/52; 60/783

(58) Field of Classification Search .................. 62/619, 62/228.1, 611, 613; 290/52; 60/39.07, 39.05, 60/39.182, 39.3, 783
See application file for complete search history.

(56) References Cited

U.S. PATENT DOCUMENTS 3,780,534 A    12/1973    Lofredo et al.

(Continued)

FOREIGN PATENT DOCUMENTS

| EP | 0529307 A1 | 3/1993 |
| EP | 0963095 A2 | 12/1999 |

OTHER PUBLICATIONS

F. Kleiner, S. Rausch, J. Knabe, "Increase power and efficiency of LNG refrigeration compressor drivers", Hydrocarbon Processing, Jan. 2003, pp. 67-69.

(Continued)

*Primary Examiner*—William C Doerrler

(57) ABSTRACT

A drive system for a refrigeration compressor such as is used in a natural gas liquefaction plant, allowing the desired compressor speed and maximum turbine efficiency to be maintained throughout varying ambient temperature conditions. A gas turbine is used with an electric starter motor with drive-through capability located on a common drive shaft between the turbine and the compressor. A variable frequency drive (VFD) is connected between the electrical power grid and the electric motor for smooth startups, but also to allow excess turbine mechanical power to be converted to electrical power by the motor operating as a generator, and delivered to the grid at the grid frequency. Pulse width modulation technology may be used to reduce harmonic distortion in the VFD's output. The starter motor also functions as a helper motor when the turbine output is insufficient to drive the compressor at the rotational speed needed to meet throughput requirements.

11 Claims, 1 Drawing Sheet

U.S. PATENT DOCUMENTS

| | | | |
|---|---|---|---|
| 4,119,861 A | | 10/1978 | Gocho |
| 4,434,613 A | | 3/1984 | Stahl |
| 4,566,885 A | | 1/1986 | Haak |
| 5,491,969 A | | 2/1996 | Cohn et al. |
| 5,689,141 A | * | 11/1997 | Kikkawa et al. .............. 290/52 |
| 6,393,867 B1 | | 5/2002 | Guillard |
| 6,463,740 B1 | | 10/2002 | Schmidt et al. |
| 6,484,490 B1 | | 11/2002 | Olsen et al. |
| 2001/0004830 A1 | | 6/2001 | Wakana et al. |
| 2002/0067042 A1 | | 6/2002 | Alvarez Orgega et al. |
| 2002/0114985 A1 | | 8/2002 | Shkolnik et al. |
| 2003/0052485 A1 | | 3/2003 | Poteet et al. |
| 2003/0074900 A1 | | 4/2003 | McFarland |

OTHER PUBLICATIONS

European Search Report No. 110737, dated Jun. 24, 2004 for U.S. Appl. No. 60/517,955, 3 pages.

PCT International Search and Written Opinion, mailed Feb. 16, 2006, for PCT/US04/30669, 7 pages.

PCT International Preliminary Report on Patentability, mailed May 18, 2006, for PCT/US04/30669, 5 pages.

* cited by examiner

METHOD FOR EFFICIENT NONSYNCHRONOUS LNG PRODUCTION

CROSS REFERENCE TO RELATED APPLICATIONS

This application is the National Stage of International Application No. PCT/US04/30669, filed 20 Sep. 2004, which claims the benefit of U.S. Provisional Patent Application No. 60/517,955, filed 6 Nov., 2003.

FIELD OF THE INVENTION

The present invention relates generally to the subject of natural gas liquefaction plants and, more particularly, to LNG (liquefied natural gas) plants that are powered by gas turbines. Specifically, the invention is a method of operating an LNG refrigeration compressor and associated starter/helper motor that allows the gas turbine to operate continually at its most efficient (maximum power) rating yet also allows for throughput control via variation in the rotational frequency of the compressor, notwithstanding ambient temperature variations.

BACKGROUND OF THE INVENTION

LNG or Liquefied Natural Gas results from a process in which natural gas is cooled until it becomes a liquid. Liquefying natural gas allows for economical transport of natural gas when pipeline transport is cost prohibitive.

Refrigeration processes for LNG generally require refrigeration compressors and compressor drivers and, depending on the size of the LNG facility, there may be multiple refrigeration compressors and drivers.

Currently, LNG production is dependent on industrial gas turbines for mechanical power to drive the refrigeration compressors used to cool or refrigerate the natural gas. Most industrial gas turbines that are used in LNG facilities were originally developed for the electrical power industry and adapted for use as compressor drivers. These gas turbines are either designed for the 50 Hz electrical market in which the gas turbine operates at 3000 rpm or for the 60 Hz electrical market with operating speed of 3600 rpm. Speed variation in power generation is not allowed because of the precise requirement of 50 Hz or 60 Hz power. Any deviation from 3000 rpm or 3600 rpm for 50 Hz and 60 Hz power, respectively, will result in significant problems for electrical users. For example, if the turbine and associated compressor are operating at 3100 rpm, but the electrical grid frequency is 50 Hz (3000 rpm), the generated frequency would be 51.7 Hz. Generating electrical power at 51.7 Hz causes significant problems for users connected to the electrical system. Typically, electrical systems have a frequency tolerance of only ±0.5 Hz. Nevertheless, typical gas turbines designed for power generation do have some frequency variability, on the order of ±5%. This is useful in maximizing LNG production. Another characteristic of such gas turbines is that they are designed to be most efficient when operating at their maximum power. Fully loading the turbine at any speed allows operation at peak efficiency and reduces emissions and specific fuel consumption. The fuel flow rate can be varied to increase or decrease the amount of mechanical energy the turbine produces. Increasing and decreasing the fuel flow rate can be done such that the gas turbine shaft speed remains constant, e.g., 3,000 or 3,600 rpm. Operating a gas turbine at lower fuel rates will significantly reduce its efficiency and increase its emissions.

Starting a gas turbine that is used for power generation is relatively easy because the generator is not energized and the only power required is the power to spin the gas turbine and generator up to operating speed. Once at operating speed, the starter is disengaged and the gas turbine takes over and powers the generator. On the other hand, starting a gas turbine that is used as a compressor driver is much more demanding compared to starting a gas turbine driving an electrical generator. In general, the power required to start a gas turbine and compressor is much greater because of the compression load. The refrigerant is flowing through the compressor during the starting process and the power required increases substantially with increasing speed. A large starting motor is required to spin the turbine and compressor up to operating speed. Typically, this starter motor is an electric motor.

In a typical LNG refrigeration configuration, illustrated in FIG. 1, a common drive shaft 5 connects the gas turbine 2 to one end of the compressor 3 and the starter motor 1 to the other end of the compressor 3. The three connected devices are referred to as a compression string and multiple compression strings are referred to as an LNG train.

To avoid the drive train shock of an "across the line" startup, a frequency converter 4 is used between the electrical power supply and the starter motor 1. The starter motor 1 is gradually brought up from 0 Hz to the line frequency (50 or 60 Hz, as the case may be). A popular type of frequency converter for such applications is called a Variable Frequency Drive, or "VFD."

Once the starter motor has accelerated the string to the desired operating speed, the gas turbine takes over and provides all the necessary shaft power. At that juncture, the electricity to the starter motor is turned off, and the motor is allowed to "free-wheel." In some LNG plants, the starter motor is also used, as needed, to provide additional shaft power while the gas turbine and compressor are at operating speed. Adding shaft power while the gas turbine is operating is referred to as "helper" duty.

The primary reason for the helper function is that gas turbine output power depends on the ambient conditions. As the ambient temperature increases, the air density decreases and therefore the gas turbine power decreases. Conversely, as the ambient temperature decreases, the gas turbine power increases. Therefore, LNG production will tend to decline in the warmer months, and increase in colder months. Smaller production variations will occur over the course of a 24-hour period as the temperature rises during the day and falls at night. The helper function may be used to maintain constant LNG production rates by providing additional power. The helper function is needed only in the warmer part of the year and daytime when gas turbine power is reduced. During the cooler part of the year and at night, the gas turbine may be producing excess mechanical power. During such times, the practice has been to reduce the fuel flow rate to the gas turbine enough to eliminate excess power production (maintaining rotational speed) and accepting non-optimum gas turbine operating efficiency. However, Kikkawa discloses (in U.S. Pat. No. 5,689,141) a method for converting the excess mechanical power to electrical power by using the starter/helper motor as an electrical generator. No major alterations are required to make an electric motor reversible so that it can also function as an AC generator. The converted excess turbine power can then be transferred to the electric power supply grid, which may be external or—in the case of many LNG plants—self-generated using the available natural gas as fuel. The generated electrical power reduces the LNG plant's electrical power needs.

The turbine can be sized to provide the power the associated compressor requires during the warmest part of the year. When the temperature drops and less power is required, the turbine can continue to operate at its maximum power output where it is most efficient, with excess mechanical energy converted to electrical power by the starter motor operating in generator mode. (The fuel/air mixture for the gas turbine is readjusted as the temperature changes.)

Kikkawa advocates operating the compression string at the precise rotational speed of 3,000 rpm (if the grid frequency is 50 Hz) or 3,600 rpm (if the grid frequency is 60 Hz) so that the frequency of the electricity that is generated matches the electrical system frequency. This may be called "synchronous" operation. Kikkawa recognizes that non-synchronous operation is an alternative, with a frequency converter used to change the frequency of the generated power to the grid frequency. That frequency converter would be the same one used to provide gradual startup when the starter motor is used to bring the LNG train up to operating speed. However, Kikkawa concludes that such increased use of the frequency converter, an expensive device, would necessitate having a spare frequency converter. Kikkawa teaches synchronous operation to avoid this significant, added capital investment. Kikkawa's method allows the gas turbine to be operated at its most efficient, but provides no throughput control, i.e., the gas turbines in his arrangement can operate at maximum power at synchronous speed but not maximum power at any other speed. Furthermore, Kikkawa makes no allowance for maintaining stability during transient periods of compressor string operation. The electrical connection between the propane and mixed refrigerant compression strings has its mechanical equivalent in a rigid coupling, making stable operation more difficult to control. The configuration does not include the capability to send excess power to the grid for use in other parts of the plant or outside the plant during these transient periods.

SUMMARY OF THE INVENTION

The invention is a drive system for a refrigeration compressor such as those used in natural gas liquefaction plants, comprising in one embodiment a gas turbine to provide primary power to run the compressor, an electric starter/helper motor/generator with drive-through capability positioned between the turbine and compressor on a common drive shaft, and a frequency converter electrically connected between the electric motor/generator and the electrical power grid. The frequency converter conditions the AC frequency both from the grid for smoother startup and nonsynchronous helper duty as well as to the grid so that excess turbine mechanical power can be converted to electrical power by the generator and supplied to the grid at the grid frequency, thus permitting the turbine speed to be dictated by throughput needs. In some embodiments, the frequency converter is a VFD with pulse-width modulation circuitry to reduce harmonic distortion in the output of the frequency converter. The invention is particularly suited for natural gas liquefaction plants where it is desirable to run the gas turbine at its maximum power for maximum efficiency and also to be able to vary the compressor rotational speed for throughput control, notwithstanding varying ambient temperature conditions which affect gas turbine output power.

BRIEF DESCRIPTION OF THE DRAWINGS

The present invention and its advantages will be better understood by referring to the following detailed description and the attached drawings. FIG. 2 illustrates the equipment system and configuration needed for the present invention, while

DETAILED DESCRIPTION OF THE INVENTION

Figure 2:
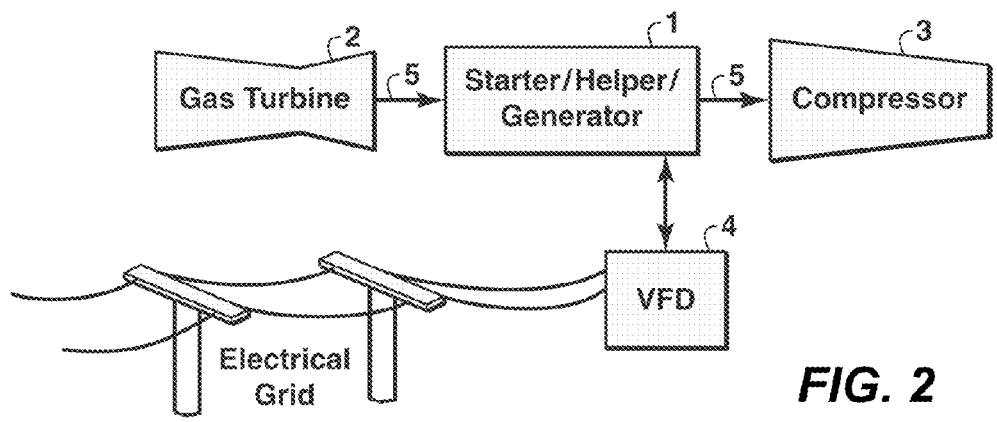

The present invention is a non-synchronous drive system for a refrigeration compressor such as is used in a natural gas liquefaction plant. FIG. 2 illustrates the configuration of the system of equipment in the present invention. The primary drive power is supplied by a gas turbine 2, sized to be capable of driving the refrigeration compressor (or compressors) 3 and producing excess mechanical power under the more favorable ambient temperature conditions that can be expected. The system includes an electrical starter motor/generator 1. This motor, regulated by a frequency converter 4 such as a VFD, starts the compression string from rest, and supplies additional torque in the helper mode as needed to compensate for warm weather decrease in turbine power output. Operating in generator mode, the motor converts excess mechanical power to electrical power. The compressor speed is dictated by plant LNG-throughput needs. The VFD is used not only for startup and helper duty, but also to condition the frequency of generated electrical power to meet grid requirements.

As stated previously, the gas turbines have some range of speed variation. Though relatively small, this range still provides significant impact upon plant economics through the capability to vary LNG throughput by changing the speed of the compressor(s). In particular, the ability to run the compressor 5% faster than synchronous speed, and thus increase, or decrease by reducing the compressor speed, LNG output proportionately, is significant and this flexibility is an important feature of the present invention. Use of the VFD beyond the traditional startup role (described in more detail below) makes this non-synchronous operation possible.

The energy balance equation for the present invention's mode of operation may be written:

Turbine Power+[Helper/Generator Motor Power]= Compressor Power Demand

The term on the right-hand side of the equation, Compressor Power Demand, is a measure of plant LNG throughput and increases or decreases with the rotational speed of the LNG string. The first term on the left-hand side, Turbine Power, is maintained via the fuel supply valve at the maximum power, for efficiency reasons. The maximum power is a function of the ambient temperature, and the fuel/air mixture is adjusted as temperature changes. The second term on the left-hand side, the Helper/Generator Motor Power provides the means to balance the equation even as the frequency is varied to non-synchronous frequencies for plant LNG throughput control. This term is positive when the motor is used in the helper mode, and negative when used in the generator mode. The invention will next be described in more detail.

Starter/Helper/Generator Functions

The motor/generator has three integrated functions: starter/helper/generator. The starter function accelerates the turbine from zero speed to full speed following the predetermined requirements of the machine. In addition to the turbine, the starter motor must also accelerate the inertia of the entire compression string plus the aerodynamic load of the compressors. Inertia refers to the mass of the shaft and the power required to accelerate the rotor mass from zero speed to full speed. The aerodynamic load refers to the power required to compress the refrigeration gas as the compression string is accelerated to full speed. The required compression power during the starting process substantially increases as the speed increases. The inertial and aerodynamic compressor loads govern the starter motor power needs. During the start sequence, the turbine inlet and exhaust ducting must be purged of combustible gases prior to ignition. This purge process is performed by rotating the string shaft at a low speed for a predetermined time, then the turbine is accelerated to its full operating speed in a predetermined manner. The entire starting process can be done without risk of equipment damage only if the starter motor has full speed control. A VFD provides the needed speed control.

A VFD operates by converting the input AC signal to DC, then generating an AC output at a different frequency. The frequency of the electricity controls the speed of an electric motor and a VFD allows for infinite frequency control and hence motor speed control. Using a VFD for speed control of the starting motor, the motor can operate at the required speeds to satisfy the gas turbine starting schedule. In addition, the VFD limits the in-rush current to the motor and avoids overheating and possible damage to the motor.

The helper mode supplies additional mechanical power when the gas turbine cannot supply all of the required mechanical power. This situation occurs when the ambient temperatures are warmer than the design ambient temperatures. A VFD is used in helper mode to provide additional power at any speed. As stated, the gas turbine will have some variable speed capability that can be used for capacity control. Therefore, the gas turbine speed is not necessarily a typical synchronous speed of 3000 rpm (50 Hz) or 3600 rpm (60 Hz). Capacity control by way of speed control is an advantage that can only be realized when the helper motor is operated via a VFD or similar frequency control device. A motor that is not operated via a VFD must operate at the prevailing synchronous speed; thus capacity control by way of speed control is not possible.

The generator mode converts excess mechanical power into electrical power. This situation occurs when the ambient temperatures are cooler than the design ambient temperature and the gas turbine produces more mechanical power. The same VFD that is used for the starting and helper functions is also used to operate the motor as a generator. Such need for the VFD arises when the variable speed capability of the gas turbine is utilized for capacity control, in which case the electrical power generated from excess mechanical power will be non-synchronous with the grid. Excess gas turbine power is thus converted to useable electrical power regardless of the speed at which the gas turbine may be operating. Again, the speed at which the gas turbine is operating is not necessarily a typical synchronous speed of 3000 rpm (50 Hz) or 3600 rpm (60 Hz). Power generation via a VFD allows the excess mechanical power to be converted to electrical power at speeds other than the prevailing synchronous speed or grid frequency. The VFD conditions the non-synchronous generated power to match the grid frequency. A generator that is not operated via a VFD must operate at synchronous speeds, thus capacity control and LNG optimization by way of speed control is not possible.

The Variable Frequency Drive

As stated, the starter/helper/generator requires a VFD (variable frequency drive) or other frequency converter to operate in the present inventive method. The VFD (indicated by 4 in FIG. 2) converts AC power into DC power then converts the DC power back to AC power at a specified frequency. VFD's that are suitable for this invention may be purchased from ASIRobicon or Mitsubishi Electric. As indicated in FIG. 2, the AC/DC/AC conversion can occur in either direction "from the grid" or "to the grid". The grid may be the local power distribution system within a plant or the grid could be the power distribution system of an electric utility company. A "from the grid" conversion supplies electrical power for starting and helping functions, i.e., additional mechanical power. A "to the grid" conversion sends excess mechanical power that has been converted to electrical power via the generator function to the grid.

An inherent advantage of utilizing a VFD is that it allows the LNG refrigeration string or strings to have a capacity control mechanism by adjusting the speed of the compression strings. As the compression string speed is increased (e.g., from 3000 rpm to 3100 rpm) the capacity or throughput is increased. Alternatively, as the compression string speed is decreased (i.e., from 3000 rpm to 2900 rpm) the capacity or throughput is decreased.

In the present invention, the VFD and motor operate together as a starter system for the compression string. The VFD conditions the electrical frequency supplied to the starter motor such that the speed of the motor is then controlled by the conditioned electrical frequency. As the electrical frequency is increased, the starter motor speed is increased and conversely as the electrical frequency is decreased the motor speed is decreased. Similarly, the motor and VFD combination may operate in helper mode to assist the gas turbine by supplying additional power. As described for the starting mode, the VFD conditions the electrical frequency supplied to the helper motor such that the speed of the motor is then controlled by the conditioned electrical frequency. During the helper mode, the VFD provides the proper frequency control to match the gas turbine speed.

Electrical power generation requires either a constant operating speed or some means to compensate for "off" speed power generation. Normally, a 50 Hz power grid requires the generators to operate at 3000 rpm and a 60 Hz power grid requires the generators to operate at 3600 rpm. Any deviation from synchronous speeds for power generation will cause significant problems for the electrical power users that are connected to the grid. In the present invention, the VFD supplies the means for the compensation for the "off" speed power generation by the AC/DC conversion process described earlier.

The process of converting mechanical power to electrical power may be described by an example in which the local grid frequency is 50 Hz, but the LNG process requires the compressor(s) to operate at 3100 rpm. If the string generator was connected directly to the grid (no VFD), the generated frequency would be 51.7 Hz. This situation is unacceptable and would cause electrical problems for the grid. Utilizing a VFD allows the string-generated frequency of 51.7 Hz (3100 rpm) to be conditioned to the grid frequency of 50 Hz. This capability allows for speed variation of the compression string for capacity control while generating electricity to the grid at the required frequency. This capacity control scheme can also be used in a 60 Hz electrical grid. The gas turbine controls, along with the VFD, provide the means for managing LNG capacity control as well as controlling the excess mechanical power that is converted to electrical power. The fact that the VFDs can be used to convert power at any frequency to grid frequency greatly enhances the operability of the configuration, as the gas turbine speed can be changed to match the compressor requirements without impacting the export of power to the grid. It also increases the stability of the process during transients, as the VFDs allow the operating speeds of the turbine-driven refrigeration compressor strings in an LNG train to be decoupled: a change in the speed requirement of one of the compressor strings allows for the speed to be increased or decreased as necessary without impacting the speed of the other compressor. In spite of this decoupling, the VFDs can efficiently import and export power to each compression string as necessary. The VFDs in use during operation serve to ensure the smooth import and export of power and overall operational stability.

A VFD will emit some level of harmonic distortion to the motor and to the grid. Two different types of VFD are commercially available. The harmonic distortion varies greatly with the type of VFD (LCI or PWM). An LCI (Load Commutated Inverter) type VFD will emit more harmonic distortion than a PWM (Pulse Width Modulated) type VFD. Consequently, an LCI-type VFD requires external electrical filters to reduce disruptive harmonic distortions. External filters require a relatively large space as compared to the space required for the VFD cabinet. Harmonic filters require periodic maintenance and are designed for an electrical system that is not expected to change over time. The electrical system will be changed if additional electrical components are added and connected to the grid. Consequently, the filter design must be changed to accommodate the modified electrical system.

A PWM-type VFD emits much less harmonic distortion and external filters are not needed. Changes to the electrical system and grid do not impact a PWM-type VFD. For the present invention, a PWM-type VFD is used in preferred embodiments and is available from ASIRobicon or Mitsubishi Electric. PWM-type VFD's have been used in many applications such as: pump applications, pipeline applications, centrifugal fan and centrifugal compressor applications. However, the LCI-type VFD may also be used in the present invention, and such a VFD can be purchased from Mitsubishi Electric, Siemens, ABB, or Alstom.

Kikkawa argues that use of the VFD for more than startup would require that a spare VFD be kept on hand. Since the VFD is relatively expensive, Kikkawa concludes that it is economically advantageous to avoid this added capital investment and operate in the synchronous mode. In the present inventive method, this potential problem is mitigated by modular design and by keeping spare VFD parts on hand.

A PWM VFD may be constructed in such a manner that the total output power is achieved by connecting multiple smaller VFD modules in parallel. By connecting multiple small VFD's in parallel, individual VFD modules can be electrically isolated and repaired while the remaining VFD modules continue to operate. The power rating of each VFD module must be such that if one module is out of service the remaining VFD modules can collectively supply the required electrical power to/from the motor/generator. Each VFD module is comprised of several power modules that can be easily replaced when defective. The defective power modules are sent out for repairs then returned as spare parts. The power modules are the building blocks of a large PWM VFD and are relatively inexpensive compared to an entire VFD. In this manner, the use of a PWM VFD for both motor and generator duty is economically and technically advantageous. The life cycle cost is more cost effective, and a motor and VFD functions as both a starter/helper and a generator. In addition, on-line repair significantly increases the overall reliability of the VFD and increases the overall availability of the LNG plant. Modular PWM VFD's are commercially available.

Starter/Helper/Generator Location within the String

Figure 1:
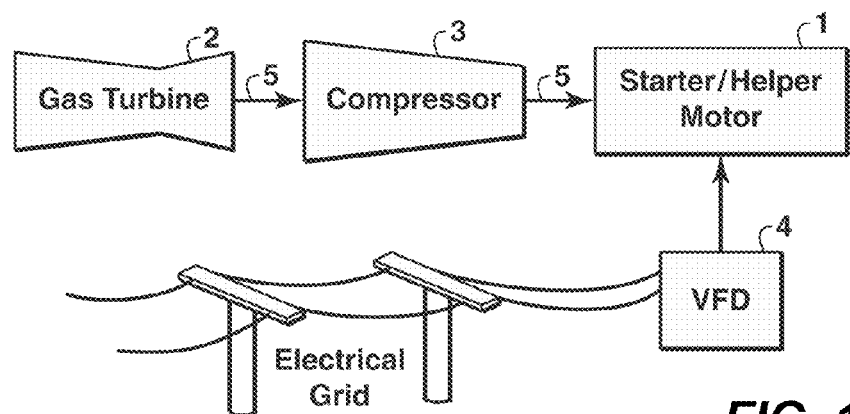
FIG. 1 is a schematic diagram of a typical LNG refrigeration configuration in current use.

FIG. 2 illustrates the motor/generator integration within the compression string for the present invention. The motor/generator 1 is placed between the gas turbine 2 and the compressor 3 instead of the conventional LNG configuration in which the compressor is between the motor and the turbine as shown in FIG. 1. (See also FIG. 1 in the Kikkawa patent.) There is a common drive shaft 5, and the motor must have a "drive-through" capability equal to or greater than the gas turbine output power. Drive through refers to the mechanical design of the motor to allow the gas turbine power to be transmitted to the compression equipment through the motor on a coupled shaft. The motor shaft must be designed to transmit the gas turbine power and the motor power. Advantages of the configuration of the present invention are: ease of maintenance, standard coupling, standard lube oil system, and standard turbine-generator skid configuration.

Figure 3:
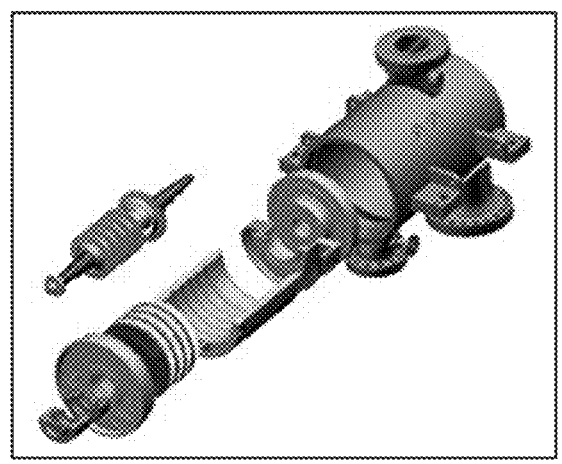
FIG. 3 is a schematic of a barrel compressor with the inner parts extracted from one end for convenient maintenance. The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

Ease of maintenance Locating the motor between the gas turbine and the compressors allows maintenance access to the compressor at the end of the compression string. The last compressor is generally the high-pressure compressor body and a barrel type of compressor is used for this compression duty. Barrel compressors require one end of the compressor to be free of obstructions to extract the internal parts of the compressor during maintenance procedures. FIG. 3 illustrates the inner parts of a barrel compressor extracted for maintenance. If the motor were located in the conventional LNG location at the end of the compression string, the motor would need to be removed to perform maintenance on a barrel compressor located between the motor and gas turbine.

Standard gas turbine-generator coupling Locating the motor between the gas turbine and generator is a standard arrangement for gas turbines used in electrical power generation. The coupling used to connect the gas turbine to the motor is thus a standard coupling.

Standard gas turbine-generator lube oil system The lube oil system for the gas turbine and motor is a standard design for power generation applications. The gas turbine lube oil system is generally sized to accommodate the gas turbine and motor requirements. If the compressor is located between the motor and the gas turbine, a common lube system for the gas turbine and the motor is impractical.

Standard gas turbine-generator skid configuration The skid or the framework that the gas turbine and motor are mounted upon is also a standard design. Using standard designs reduces cost and manufacturing time.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

We claim:

1. A drive system for non-synchronous operation of a refrigeration compressor, comprising: a gas turbine adapted to drive the compressor; an electric motor with drive-through capability, electrically connected to an AC power grid and mechanically connected to the turbine and compressor and located between them on a common drive shaft and capable of starting the turbine and compressor from rest and bringing them up to operating rotational speed, said motor being adapted to also function as an AC generator for converting excess turbine mechanical power to electrical power; and a frequency converter connected between the motor and the power grid to condition the frequency in both directions (to the grid and from the grid) thereby allowing both non-synchronous operation and most efficient gas turbine operation.

2. The drive system of claim 1, wherein the frequency converter is a variable frequency drive.

3. The drive system of claim 2, wherein the variable frequency drive is of the pulse-width modulated type.

4. The drive system of claim 3, wherein the variable frequency drive is of modular design.

5. The drive system of claim 1, wherein the turbine is sized such that its rated power output is substantially equal to the power required to drive the compressor in expected average ambient temperature conditions.

6. The drive system of claim 1, wherein the electric motor is sized to produce sufficient power to supplement the power output of the turbine such that the compressor can be operated at desired rotational speed in hottest expected ambient temperature conditions.

7. The drive system of claim 1, wherein the refrigeration compressor is designed for use in a natural gas liquefaction plant.

8. A method for operating a gas turbine powered refrigeration compressor for liquefying natural gas having an electric starter/helper motor/generator with drive-through capability located on a common drive shaft between the turbine and the compressor, and further having a frequency converter electrically connected between the electric motor/generator and an AC power grid, said method comprising the following steps:

(a) using the electric motor to bring the turbine and compressor up to operating rotational speed as the frequency of the AC power supplied to the motor from frequency converter is gradually brought up to compression string operating speed;

(b) supplying power from the turbine, supplemented as necessary by the electric motor, to spin the compressor at the rotational speed required for desired throughput, said turbine being operated substantially at its most efficient power output; and (c) diverting any excess turbine power to the motor/generator operating in generator mode, then using the frequency converter to condition the frequency of the generator's AC output to that of the grid before delivery to the grid.

9. The method of claim 8, wherein the frequency converter is a variable frequency drive.

10. The method of claim 9, wherein the variable frequency drive is of the pulse-width modulated type.

11. The method of claim 10, wherein the variable frequency drive is of modular design.

* * * * *